United States Patent

[11] 3,623,782

[72] Inventors Tokio Nakanishi;
Tetsuo Hayashi, both of Osaka, Japan
[21] Appl. No. 23,719
[22] Filed Mar. 30, 1970
[45] Patented Nov. 30, 1971
[73] Assignee Toyo Bearing Manufacturing Company Limited
Osaka-shi, Japan

[54] DEVICE FOR PREVENTING SPIN OF OUTER RACE IN BEARING UNIT
4 Claims, 4 Drawing Figs.
[52] U.S. Cl. .................................................. 308/187
[51] Int. Cl. .................................................. F16c 1/24

[50] Field of Search ............................................ 308/72, 187, 187.1, 194

[56] References Cited
UNITED STATES PATENTS
2,290,213  7/1942  Shafer .......................... 308/72

Primary Examiner—Martin P. Schwadron
Assistant Examiner—Frank Susko
Attorney—J. Y. Houghton ABSTRACT: A device for preventing the spin of the outer ring relative to the housing in a bearing unit adapted to make a spherical fit so as to be capable of self-alignment.

PATENTED NOV 30 1971 3,623,782

TOKIO NAKANISHI
& TETSUO HAYASHI,
INVENTORS

BY Hall & Houghton

ATTORNEY

DEVICE FOR PREVENTING SPIN OF OUTER RACE IN BEARING UNIT

BACKGROUND OF THE INVENTION

1. Field of the Invention

It relates to a device for preventing the spin of the outer race of a bearing unit.

2. Description of the Prior Art

The bearing body and housing of a bearing unit are usually adapted to make a spherical fit so as to be capable of self-alignment. If, however, self-alignment is to be made smooth, there is the danger of the outer race making a spin in the case of high-speed rotation under a relatively light load.

There have heretofore been suggested various spin-preventive measures with the resulting substantial improvements, buy many problems remain to be solved.

For example, in one measure, which has been practiced from of old, in which a grease hole is bored in the outer race at a corresponding position below a grease nipple screwing hole and a short round bar is dropped in through said grease nipple hole until it reaches the outer race grease hole to utilize the clearance between the hole and the short bar as a range for self-alignment, there are drawbacks including narrow range of angle of self-alignment, tendency of the bar end to block up the grease hole and necessity of aligning small holes with each other, thus making the operation complicated. Further, as another measure, there is an arrangement in which the outer diameter surface of an outer race is bored with a hole into which is driven a headed rivet the head of which is supported by the lateral edge of a notched groove in the housing, but this arrangement has the drawback of the rivet head becoming worn due to vibrations. It is believed that this stems from the fact that such rivet is usually made of softer steel resulting in the soft head of the rivet. Further, this arrangement, though advantageous in that its construction is simple, has the serious drawback that since the rivet is driven into said hole in the outer race, the accuracy of the outer race is spoiled.

SUMMARY OF THE INVENTION

A device according to the present invention comprises an axially extending space formed in the self-alignment interface between a housing and an outer race that make a spherical fit, a grease nipple screwing hole and a grease passageway bored in the housing and outer race, respectively, and being open to said space, a steel ball dropped in the space below the grease nipple screwing hole, the diameter of said steel ball being such that the steel ball extends across the self-alignment interface until it reaches the screwing hole, an intermediate member having a grease passageway in the screwing hole and rollably inserted in the space, a grease nipple screwed in said screwing hole, the arrangement being such that the range of self-alignment of the outer race with respect to the housing is controlled to have a desired wide value.

OBJECTS AND ADVANTAGES OF THE PRESENT INVENTION

An object of the present invention is to provide a spin-preventive device so constructed that, though attended with some increase in machining cost as compared with the prior art device such as described above, it is possible to achieve twice as large an angle of self-alignment as that attainable with the prior art device, whereby a wide range can be expected and that injection of grease is facilitated without spoiling the outer race accuracy.

A feature of the present invention is that it provides a device capable of preventing the spin of an outer race for a long period of time, wherein self-alignment is made smooth without the necessity of making the accuracy of fit between the outer race and housing as strict as before, an intermediate member prevents a steel ball from floating up irrespective of the position of said steel ball, the angle of self-alignment is increased, there is no possibility of the grease passageway being blocked up, and the recess and steel ball scarcely become distorted and are maintained correctly.

Another feature of the invention is that it provides a device wherein by the use of an intermediate member having an inclined surface on the upper surface, a grease passageway extending across the center at right angles to the direction of inclination, vertical grease passageways disposed at the opposed ends of said grease passageway, and threads on the outer periphery adapted to be threadedly engaged in a grease nipple screwing hole, the intermediate member provided with the inclined surface is stably held at a predetermined position during operation, and grease, upon injection, passes from the nipple via the transverse grease passageway and vertical grease passageways into the space, but since it especially advances from the passageways at both sides it lifts up the steel ball at both sides thereof to cause the steel ball to float up, there is no possibility of the ball blocking up the opening portion of the grease hole in the outer race, so that filling of grease can be satisfactorily effected.

The characteristics and advantages of the invention are further sufficiently referred to in connection with the following detailed description of the accompanying drawings which represent one embodiment. After considering this example, skilled persons will understand that many variations may be made without departing from the principles disclosed and I contemplate the employment of any structures, arrangements or modes of operation that are properly within the scope of the appended claims.

The drawing is intended to serve for illustration only. In the drawing.

Figure 1:
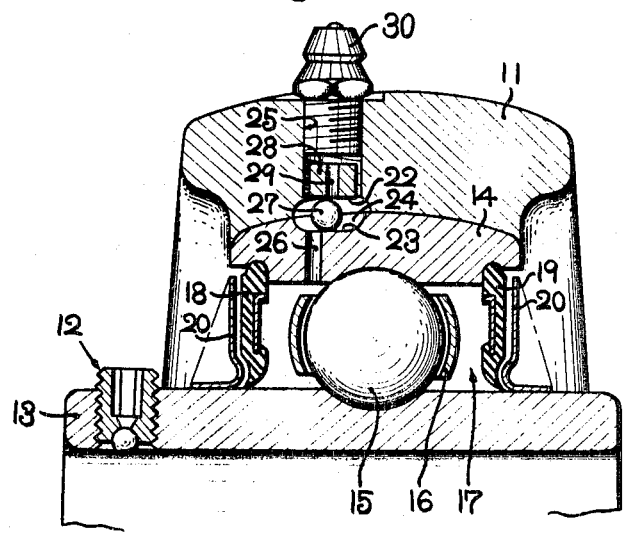
FIG. 1 is a side view in longitudinal section, of the principal portion of a self-aligning-type bearing unit embodying the present invention.

The concrete arrangement of a device for preventing the spin of the outer race of a bearing unit according to the present invention will now be described in detail with reference to the drawing.

The device for preventing the spin of the outer race of a bearing unit shown in FIG. 1 comprises a housing 11 holding the bearing body in a state in which it is capable of self-alignment, an inner race 14,13, fixed on a rotating shaft (not shown) by fixing means 12, an outer race spherically fitted in the housing, and a plurality of rolling bodies 15 interposed between the inner and outer races. The plurality of rolling bodies are supported by a retainer 16, and a space 17 defined by the inner and outer races in sealed by member 18, 19, 20 and 21. The inner diameter surface of the housing and the outer diameter surface of the outer race are provided with axially extending recess 22 and 23, with said recesses 22 and 23 defining a space 24. The housing and the outer race are respectively bored with a grease nipple screwing hole 25 and a grease passageway 26 that are open to said recesses 22 and 23. The grease passageway 26 is a hole that establishes communication between the bottom of the recess 23 and the space 27 in the bearing. A steel ball 27 is placed in the space 24 defined by said recesses 22 and 23. The diameter of the steel ball is greater than the depth of the recess 23 in the outer diameter surface of the outer race, it being so arranged that when the steel ball is placed in the space, the top of the steel ball projects above the self-alignment interface to be positioned either in the recess 22 in the inner diameter surface of the housing or in the lower end opening portion of the grease nipple screwing hole 25. The numeral 28 denotes an intermediate member dropped in the grease nipple screwing hole 25, which intermediate member has a grease passageway 29 at the center and is a short bar that is slightly smaller in diameter than the grease nipple screwing hole. After said intermediate member has been dropped in, a grease nipple 30 is screwed in the grease nipple screwing hole. In addition, the area of the recess 22 or 23 is cut in accordance with a desired angle of self-alignment.

Figure 2:
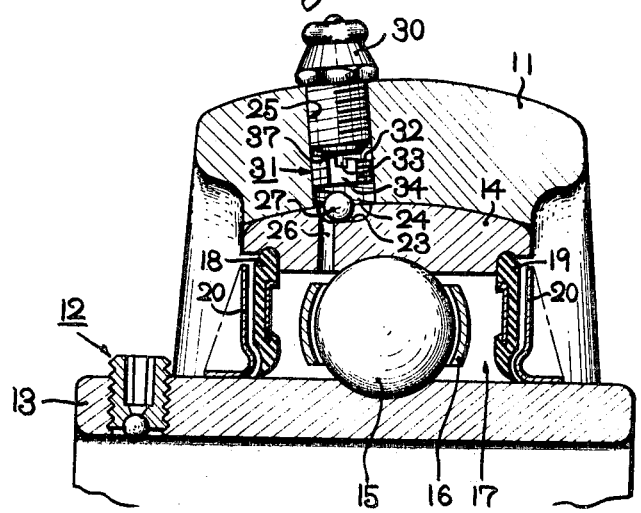
FIG. 2 is a side view, in longitudinal section, of the principal portion of a self-aligning-type bearing unit showing another embodiment of the invention.
Figures 3, 4:
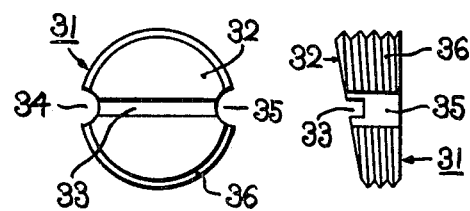
FIG. 3 is a plan view of an intermediate member for use in the self-aligning-type bearing unit shown in FIG. 2.
FIG. 4 is a side view thereof.

FIGS. 2 through 4 show another embodiment of the invention, wherein the intermediate member alone is different from the one shown in FIG. 1, the rest being of the same construction as in the bearing unit in FIG. 1; therefore, the same numerals as those in FIG. 1 denote the same members. Thus, the intermediate member 31 has an inclined surface 32 on the upper surface thereof and a grease passageway 33 extending at right angles to the direction of inclination and that across the center. The grease passageway 33 serves also as a screwdriver groove for screwing the intermediate member. Further, said intermediate member has vertical grease passageways 34 and 35 connected to the opposed ends of the grease passageway 33 and is peripherally provided with threads 36 adapted to mesh with a grease nipple screwing hole 25. FIG. 2 shows a case in which the inner diameter surface of the housing is not provided with a recess and a desired space 24 is formed by the lower end opening portion of the grease nipple screwing hole and a recess 23 in the outer diameter surface of the outer race.

The aforementioned bearing unit is assembled in the following manner.

The outer race and housing are fitted together, and after the grease nipple screwing hole 25 is aligned with the recess 23 in the outer diameter surface of the outer race, the steel ball is dropped in through the grease nipple screwing hole 25, followed by screwing the intermediate member 31 to a desired depth i.e., to a position where the rear surface of the intermediate member maintains a small clearance between it and the steel ball. The grease nipple is then screwed in until its front end reaches the inclined surface of the intermediate member. In this case, even if part of the peripheral edge of the front end surface of the grease nipple contacts a point 37 deviated from the center of the inclined surface of the intermediate member, the area of the contact point 37 is small with the resulting small frictional resistance, and the intermediate member is maintained in its predetermined position without the possibility of being turned in attendance on the rotation of the nipple. Further, because of the eccentric pressing, the threads on the side opposite to the pressing point firmly grip the threaded surface of the nipple hole, thus rendering the intermediate member immovable. Therefore, the clearance between the rear surface of the intermediate member and the steel ball can be maintained in a predetermined amount even during operation.

We claim:

1. In a bearing unit having a bearing and a housing that are spherically fitted together so as to be capable of self-alignment, a device for preventing the spin of the outer race of the bearing comprising a recess for determining the angle of self alignment formed axially in the outer diameter surface of the outer race, the outer race and housing being respectively bored with a grease passageway and a grease nipple screwing hole that are open to said recess, a steel ball with a diameter greater than the depth of said recess placed in a space defined between the recess and the grease nipple screwing hole, and an intermediate member having a grease passageway interposed between the grease nipple and the steel ball.

2. A device for preventing the spin of the outer race of a bearing unit as set forth in claim 1, characterized in that the outer diameter surface of the outer race and the opposed surface of the housing are provided with recesses for determining the angle of self-alignment, said opposed recesses defining a space for receiving the steel ball.

3. A device for preventing the spin of the outer race of a bearing unit as set forth in claim 1, characterized in that a member slightly smaller in diameter than the grease nipple screwing hole and having a grease passageway at the center extending vertically therethrough is dropped onto the steel ball below the grease nipple screwing hole, and finally the grease nipple is screwed in.

4. A device for preventing the spin of the outer race of a bearing unit as set forth in claim 1, characterized in that an intermediate member whose upper surface is formed as an inclined surface and which is formed with a grease passageway extending at right angles to the direction of inclination and across the center and also with vertical grease passageways at the opposed end positions of said grease passageway is used, said intermediate member being screwed in the grease nipple screwing hole until it reaches a position where the rear surface thereof keeps a small clearance between it and the steel ball, and finally the grease nipple is screwed in, so that the intermediate member and steel ball are displaceably held.

* * * * *